(12) United States Patent
Yap et al.

(10) Patent No.: US 9,059,646 B2
(45) Date of Patent: Jun. 16, 2015

(54) PULSE PROCESSOR OF SERVO MOTOR SYSTEM

(71) Applicant: RDC Semiconductor Co., Ltd., Hsinchu (TW)

(72) Inventors: Chang-Cheng Yap, Hsinchu (TW); Bo-Yuan Shih, Hsinchu (TW)

(73) Assignee: RDC SEMICONDUCTOR CO., LTD., Hsinchu (TW)

( * ) Notice: Subject to any disclaimer, the term of this patent is extended or adjusted under 35 U.S.C. 154(b) by 0 days.

(21) Appl. No.: 14/047,486

(22) Filed: Oct. 7, 2013

(65) Prior Publication Data
US 2015/0069948 A1   Mar. 12, 2015

(30) Foreign Application Priority Data

Sep. 12, 2013   (TW) .............................. 102133013 A

(51) Int. Cl.
*H02P 6/06* (2006.01)
*H02M 3/335* (2006.01)
*H02P 8/00* (2006.01)

(52) U.S. Cl.
CPC ........................................ *H02P 8/00* (2013.01)

(58) Field of Classification Search
USPC ................ 318/3, 34, 400.04, 400.07, 400.17, 318/400.34, 472, 599, 638, 801, 811
See application file for complete search history.

(56) References Cited

U.S. PATENT DOCUMENTS 4,668,900 A     5/1987  Tabuchi
5,359,154 A *  10/1994  Tsukasa et al. ............... 177/145
5,828,558 A * 10/1998  Korcharz et al. ............... 363/20
6,819,077 B1 * 11/2004  Seibel et al. ................... 318/801
7,755,320 B2 *  7/2010  Kawakami et al. ........... 318/811
8,072,167 B2 * 12/2011  Jeung ........................ 318/400.17
2007/0176571 A1 *  8/2007  Cheng ........................... 318/638
2009/0206782 A1 *  8/2009  Ishikawa .................. 318/400.04
2010/0188030 A1 *  7/2010  Takai ....................... 318/400.04

FOREIGN PATENT DOCUMENTS

CN           102394639         3/2012

OTHER PUBLICATIONS

Taiwan Patent Office, "Office Action," Mar. 11, 2015.

* cited by examiner

*Primary Examiner* — Bentsu Ro
*Assistant Examiner* — Cortez Cook
(74) *Attorney, Agent, or Firm* — WPAT, PC; Justin King

(57) ABSTRACT

A pulse processor includes a phase/pulse width sampler, a first calculator, a second calculator, a latching device, and a pulse width modulator. The phase/pulse width sampler generates an input direction signal, an input phase number and an input pulse width number according to a first signal and a second signal of the command pulse group. The first calculator is used for multiplying the input phase number by P/Q, thereby generating a target phase number, wherein P and Q are positive integers. The second calculator is used for multiplying the input pulse width number by Q/P, thereby generating a target pulse width number. The latching device receives the input direction signal and outputs a target direction signal. The pulse width modulator receives the target direction signal, the target phase number and the target pulse width number, and outputs a transferred pulse group.

10 Claims, 9 Drawing Sheets

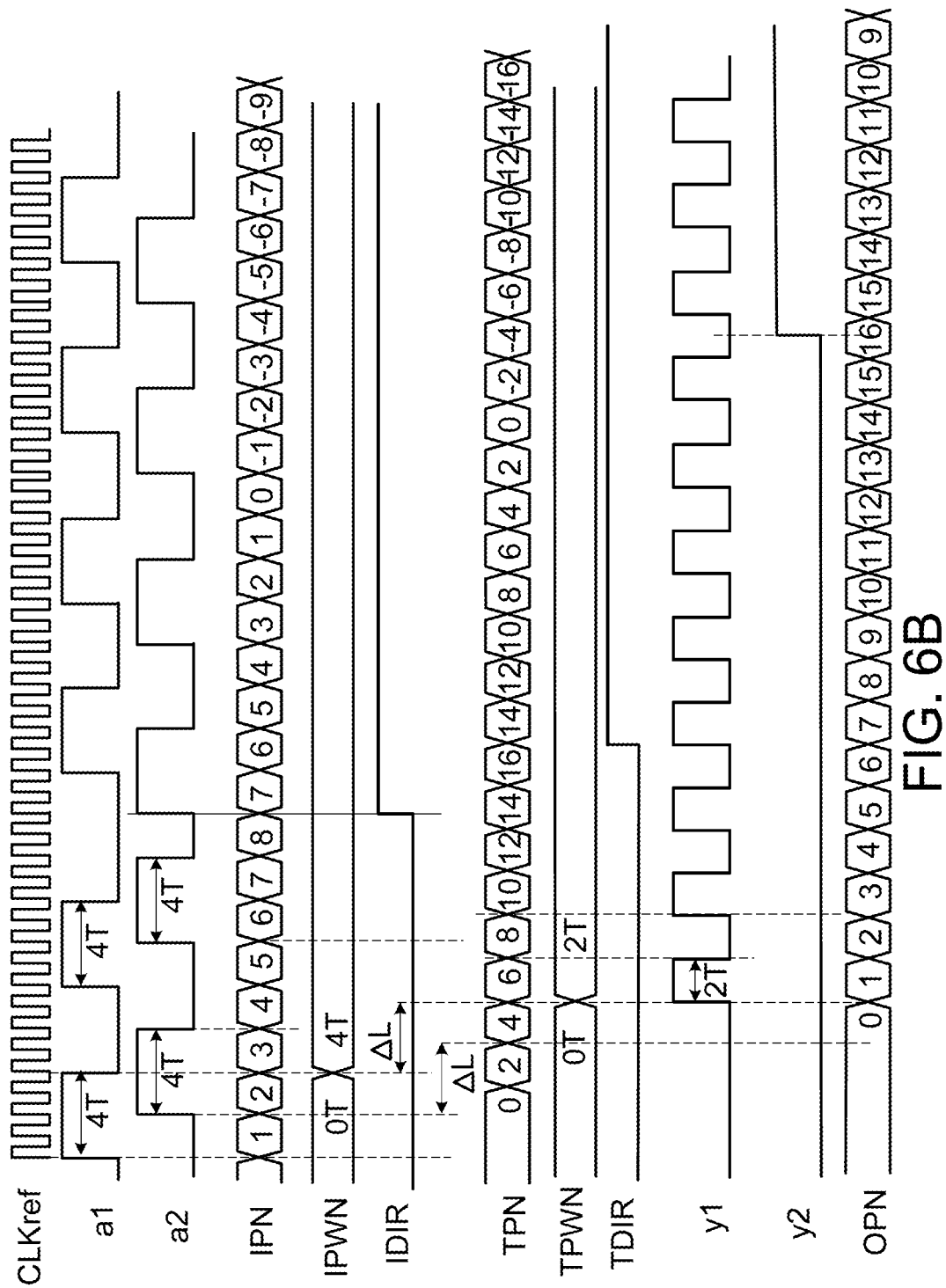

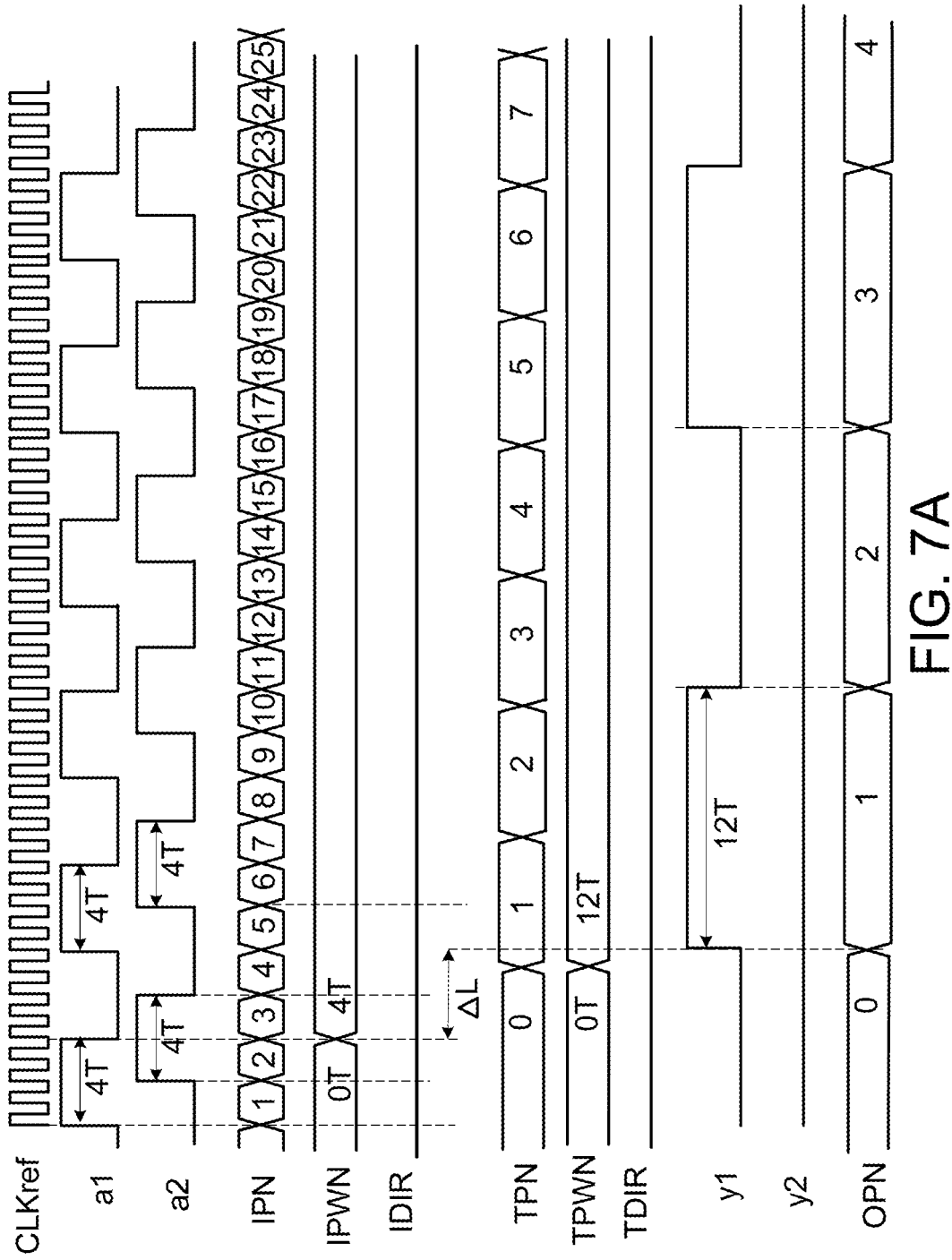

PULSE PROCESSOR OF SERVO MOTOR SYSTEM

This application claims the benefit of Taiwan Patent Application No. 102133013, filed Sep. 12, 2013, the subject matter of which is incorporated herein by reference.

FIELD OF THE INVENTION

The present invention relates to a pulse processor, and more particularly to a pulse processor of a servo motor system.

BACKGROUND OF THE INVENTION

As is well known, a servo motor system is able to precisely control the rotation speed of a servo motor, and has the fast response acceleration and deceleration capability. Due to the precise position control and speed control capability, the servo motor system has been widely used in various industrial automation industries and precision machining fields such as mechanical arms or mechanical work platforms.

Generally, during the process of controlling the servo motor system, if the rotation speed of the servo motor is quickly changed or if the rotation direction of the servo motor is irregularly changed, the servo motor system is readily out of control. That is, if the input signal of the servo motor system is subject to a fast change, the servo motor usually fails to immediately respond to the fast change of the input signal. Under this circumstance, the servo motor system is possibly out of control.

Therefore, there is a need of providing a pulse processor of a servo motor system in order to immediately respond to the change of the input signal.

SUMMARY OF THE INVENTION

An embodiment of the present invention provides a pulse processor of a servo motor system. The pulse processor is connected with a command device and a servo motor for controlling the servo motor according to a command pulse group from the command device. The pulse processor includes a phase/pulse width sampler, a first calculator, a second calculator, a latching device, and a pulse width modulator. The phase/pulse width sampler is used for generating an input direction signal, an input phase number and an input pulse width number according to a first signal and a second signal of the command pulse group. The first calculator is used for receiving the input phase number and multiplying the input phase number by P/Q, thereby generating a target phase number, wherein P and Q are positive integers. The second calculator is used for receiving the input pulse width number and multiplying the input pulse width number by Q/P, thereby generating a target pulse width number. The latching device is used for receiving the input direction signal and outputting a target direction signal. The pulse width modulator is used for receiving the target direction signal, the target phase number and the target pulse width number, and outputting a transferred pulse group.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 6B is a schematic timing waveform diagram illustrating associated signals processed by the pulse processor when the frequencies of the signals a1 and a2 of the command pulse group in an A/B phase-pulse format is multiplied by 2 and the transferred pulse group y1 and y2 in a one pulse direction-pulse format are generated;

FIG. 7A is a schematic timing waveform diagram illustrating associated signals processed by the pulse processor when the frequencies of the signals a1 and a2 of the command pulse group in an A/B phase-pulse format is multiplied by 1/3 and the transferred pulse group y1 and y2 in a clockwise and counterclockwise-pulse format are generated.

DETAILED DESCRIPTION OF PREFERRED EMBODIMENTS

Figure 1:
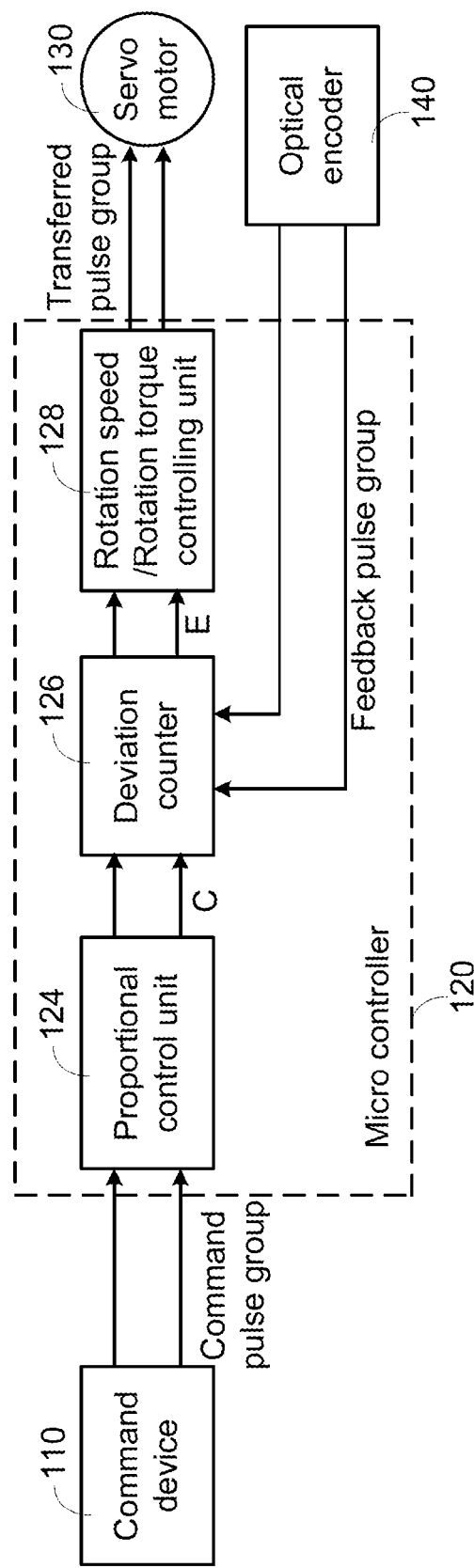
FIG. 1 is a schematic functional block diagram illustrating the architecture of a servo motor system.

FIG. 1 is a schematic functional block diagram illustrating the architecture of a servo motor system. As shown in FIG. 1, the servo motor system comprises a command device 110, a micro controller 120, a servo motor 130, and an optical encoder 140. An example of the micro controller 120 includes but is not limited to a digital signal processor (DSP). Moreover, the micro controller 120 further comprises a proportional control unit 124, a deviation counter 126, and a rotation speed/rotation torque controlling unit 128.

In response to the user's operation, the command device 110 generates a command pulse wave for controlling the rotation speed and the rotation direction of the servo motor 130. After the command pulse wave is received, the proportional control unit 124 generates a control pulse wave C at a specified proportion. Moreover, according to the control pulse wave C and a feedback pulse group wave, the deviation counter 126 generates an error signal E to the rotation speed/rotation torque controlling unit 128. According to the error signal E, the rotation speed/rotation torque controlling unit 128 generates a transferred pulse wave to the servo motor 130. According to the transferred pulse wave, the rotation speed and the rotation direction of the servo motor 130 are correspondingly adjusted. Moreover, according to the rotation speed and the rotation direction of the servo motor 130, the optical encoder 140 generates the feedback pulse group wave to the deviation counter 126. The deviation counter 126 is a feedback device. Alternatively, the deviation counter 126 may be replaced by any other appropriate device such as a resolver.

Generally, the functions of the proportional control unit 124, the deviation counter 126 and the rotation speed/rotation torque controlling unit 128 may be implemented by firmware components of the micro controller 120. As is well known, the execution speed of firmware is restricted by the processing speed of the micro controller 120. Especially when a multiplication operation, a division operation or any other appropriate mathematic operation is performed by the firmware, a great deal of systematic resource is required. Under this circumstance, the operating efficiency of the micro controller 120 is largely reduced.

After the command pulse wave from the command device 110 is received by the micro controller 120, the proportional control unit 124 performs the multiplication operation, the division operation or any other appropriate mathematic operation on the command pulse wave. Consequently, the proportional control unit 124 generates the transferred pulse wave to the deviation counter 126. In case that the command pulse wave is subject to a rapid change, the proportional control unit 124 may be overloaded. Under this circumstance, the proportional control unit 124 is unable to immediately calculate the transferred pulse wave, and thus the servo motor 130 is out of control.

Figure 2:
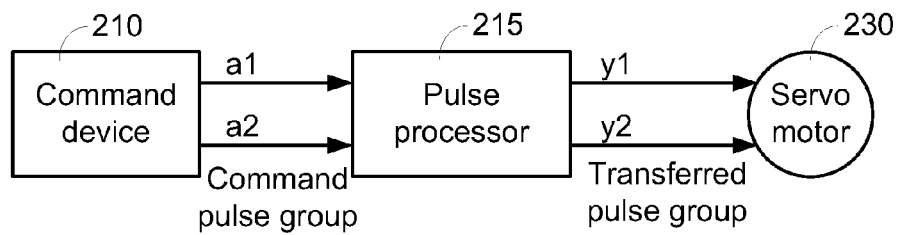
FIG. 2 is a schematic functional block diagram illustrating the architecture of a servo motor system according to an embodiment of the present invention.

FIG. 2 is a schematic functional block diagram illustrating the architecture of a servo motor system according to an embodiment of the present invention. As shown in FIG. 2, the servo motor system comprises a command device 210, a pulse processor 215, and a servo motor 230. In response to the user's operation, the command device 210 generates a command pulse group including two signals a1 and a2 in order to control the rotation speed and the rotation direction of the servo motor 230. After the command pulse group a1 and a2 are received by the pulse processor 215, the pulse processor 215 generates a transferred pulse group including two signals y1 and y2 to control the servo motor 230.

Generally, the command pulse group a1 and a2 outputted from the command device 210 may have various pulse formats. Of course, the transferred pulse group y1 and y2 outputted from the pulse processor 215 may have various pulse formats. The various pulse formats will be illustrated in more details as follows.

Figure 3A:
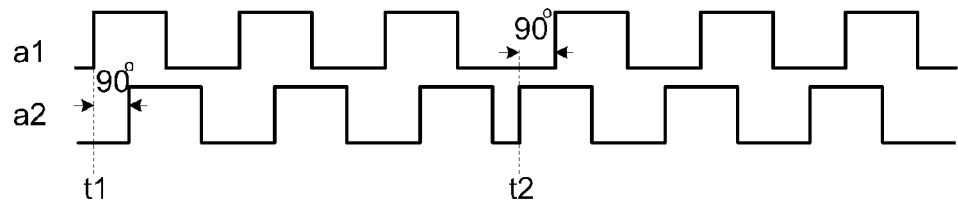
FIG. 3A is a schematic timing waveform diagram illustrating a command pulse group in an A/B phase-pulse format.

FIG. 3A is a schematic timing waveform diagram illustrating a command pulse group in an A/B phase-pulse format. In case that the phase of the signal a1 leads the phase of the signal a2 by 90 degrees, the servo motor 230 is rotated in a first direction (e.g. a clockwise direction). Whereas, in case that the phase of the signal a1 lags the phase of the signal a2 by 90 degrees, the servo motor 230 is rotated in a second direction (e.g. a counterclockwise direction). Please refer to FIG. 3A. At the time point t1, the servo motor 230 is controlled to be rotated in the first direction. At the time point t2, the servo motor 230 is controlled to be rotated in the second direction. Moreover, the pulse widths of the signals a1 and a2 indicate the driving speeds of the servo motor 230. As the pulse width of the signal a1 or a2 increases, the rotation speed of the servo motor 230 increases. Whereas, as the pulse width of the signal a1 or a2 decreases, the rotation speed of the servo motor 230 decreases.

Figure 3B:
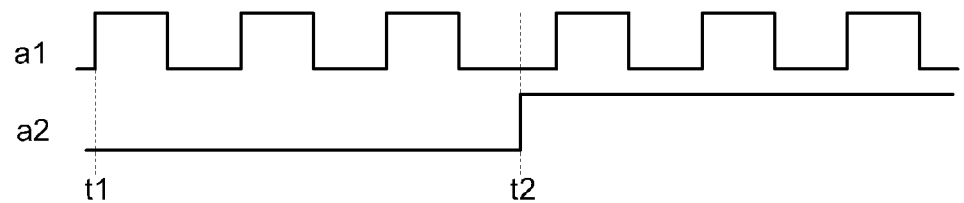
FIG. 3B is a schematic timing waveform diagram illustrating a command pulse group in a one pulse direction-pulse format.

FIG. 3B is a schematic timing waveform diagram illustrating a command pulse group in a one pulse direction-pulse format. The pulse width of the signal a1 indicates the driving speed of the servo motor 230. As the pulse width of the signal a1 increases, the rotation speed of the servo motor 230 increases. Whereas, as the pulse width of the signal a1 decreases, the rotation speed of the servo motor 230 decreases. Moreover, the signal a2 indicates the rotation direction. The low-level state of the signal a2 indicates that the servo motor 230 is controlled to be rotated in the first direction after the time point t1. Whereas, the high-level state of the signal a2 indicates that the servo motor 230 is controlled to be rotated in the second direction after the time point t2.

Figure 3C:
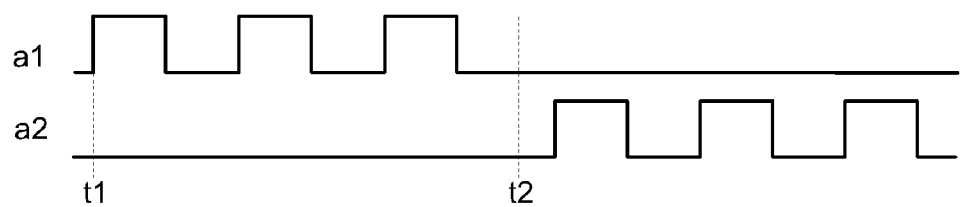
FIG. 3C is a schematic timing waveform diagram illustrating a command pulse group in a clockwise and counterclockwise-pulse format.

FIG. 3C is a schematic timing waveform diagram illustrating a command pulse group in a clockwise and counterclockwise-pulse format. When the signal a1 is activated, the servo motor 230 is controlled to be rotated in the first direction, and the pulse width of the signal a1 indicates the driving speed of the servo motor 230. When the signal a2 is activated, the servo motor 230 is controlled to be rotated in the second direction, and the pulse width of the signal a2 indicates the driving speed of the servo motor 230. That is, the servo motor 230 is controlled to be rotated in the first direction at the time point t1, and the servo motor 230 is controlled to be rotated in the second direction at the time point t2.

In FIGS. 3A~3C, three pulse formats of the command pulse group a1 and a2 are presented herein for purpose of illustration and description only. Of course, the pulse formats as shown in FIGS. 3A~3C may be applied to the transferred pulse group y1 and y2, and are not redundantly described herein.

In this embodiment, the pulse processor 215 is used for processing the command pulse group a1 and a2 and generating the transferred pulse group y1 and y2. Generally, by the pulse processor 215, the command pulse group a1 and a2 in one of the three pulse formats can be converted into the transferred pulse group y1 and y2 in one of the three pulse formats. Moreover, the pulse processor 215 may further adjust the frequencies of the signal a1 and a2 of the command pulse group. For example, by changing the frequencies of the signals a1 and a2 of the command pulse group only, the command pulse group a1 and a2 in the A/B phase-pulse format may be converted into the transferred pulse group y1 and y2 in the A/B phase-pulse format. Alternatively, by changing the frequencies and the format of the command pulse group a1 and a2, the command pulse group a1 and a2 in the A/B phase-pulse format may be converted into the transferred pulse group y1 and y2 in the one pulse direction-pulse format. Alternatively, by changing the frequencies and the format of the command pulse group a1 and a2, the command pulse group a1 and a2 in the A/B phase-pulse format may be converted into the transferred pulse group y1 and y2 in the clockwise and counterclockwise-pulse format.

Figure 4:
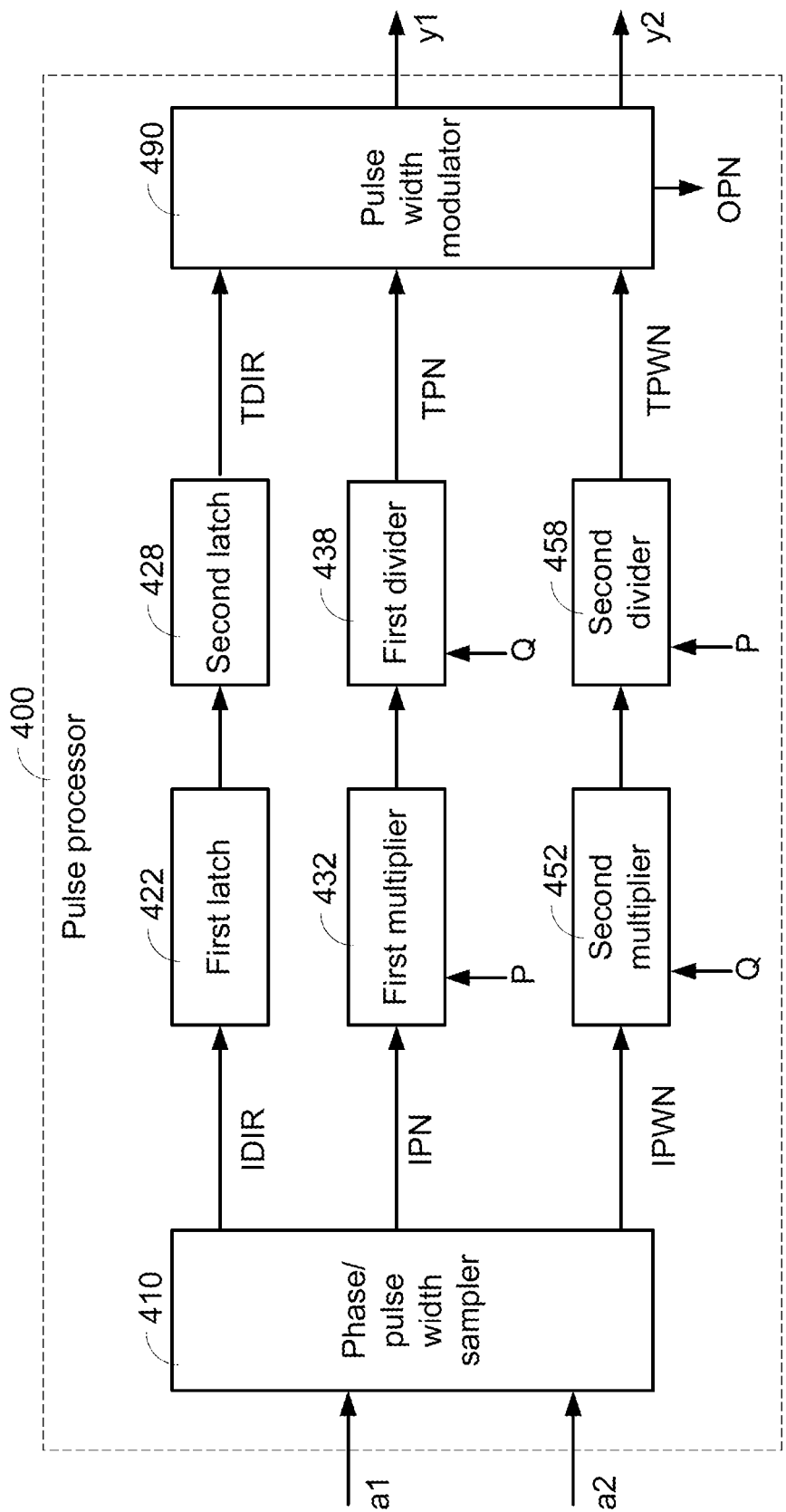
FIG. 4 is a schematic functional block diagram illustrating the architecture of an exemplary pulse processor used in the servo motor system according to the embodiment of the present invention.

FIG. 4 is a schematic functional block diagram illustrating the architecture of an exemplary pulse processor used in the servo motor system according to the embodiment of the present invention. For preventing the servo motor system from being out of control, the pulse processor 400 has to immediately convert the command pulse group a1 and a2 into the transferred pulse group y1 and y2. Consequently, all circuit components of the pulse processor 400 are implemented by hardware components rather than firmware components.

As shown in FIG. 4, the pulse processor 400 comprises a phase/pulse width sampler 410, a first latch 422, a second latch 428, a first multiplier 432, a second multiplier 452, a first divider 438, a second divider 458, and a pulse width modulator 490. According to the user's settings, the frequency of each of the command pulse group a1 and a2 may be multiplied by a factor P/Q by the pulse processor 400, wherein P and Q are both positive integers. Moreover, according to the user's settings, the transferred pulse group y1 and y2 with a specified pulse format are outputted from the pulse width modulator 490.

After the command pulse group a1 and a2 are inputted into the phase/pulse width sampler 410, the command pulse group a1 and a2 are sampled by the phase/pulse width sampler 410 according to a reference clock. Consequently, an input phase number IPN and an input pulse width number IPWN are generated. Of course, the phase/pulse width sampler 410 may also generate an input direction signal IDIR according to the command pulse group a1 and a2.

As the command pulse group a1 and a2 change, the input direction signal IDIR, the input phase number IPN and the input pulse width number IPWN are continuously generated by the phase/pulse width sampler 410. Through pipelining transformation, the input direction signal, the input phase number and the input pulse width number are calculated stagewise by the pulse processor 400. Consequently, a target direction signal TDIR, a target phase number TPN and a target pulse width number TPWN are continuously generated and transmitted to the pulse width modulator 490, and the transferred pulse group y1 and y2 with the specified pulse format and an output phase number OPN are outputted from the pulse width modulator 490. A signal processing process for the pulse processor 400 will be illustrated in more details as follows.

Figure 5A:
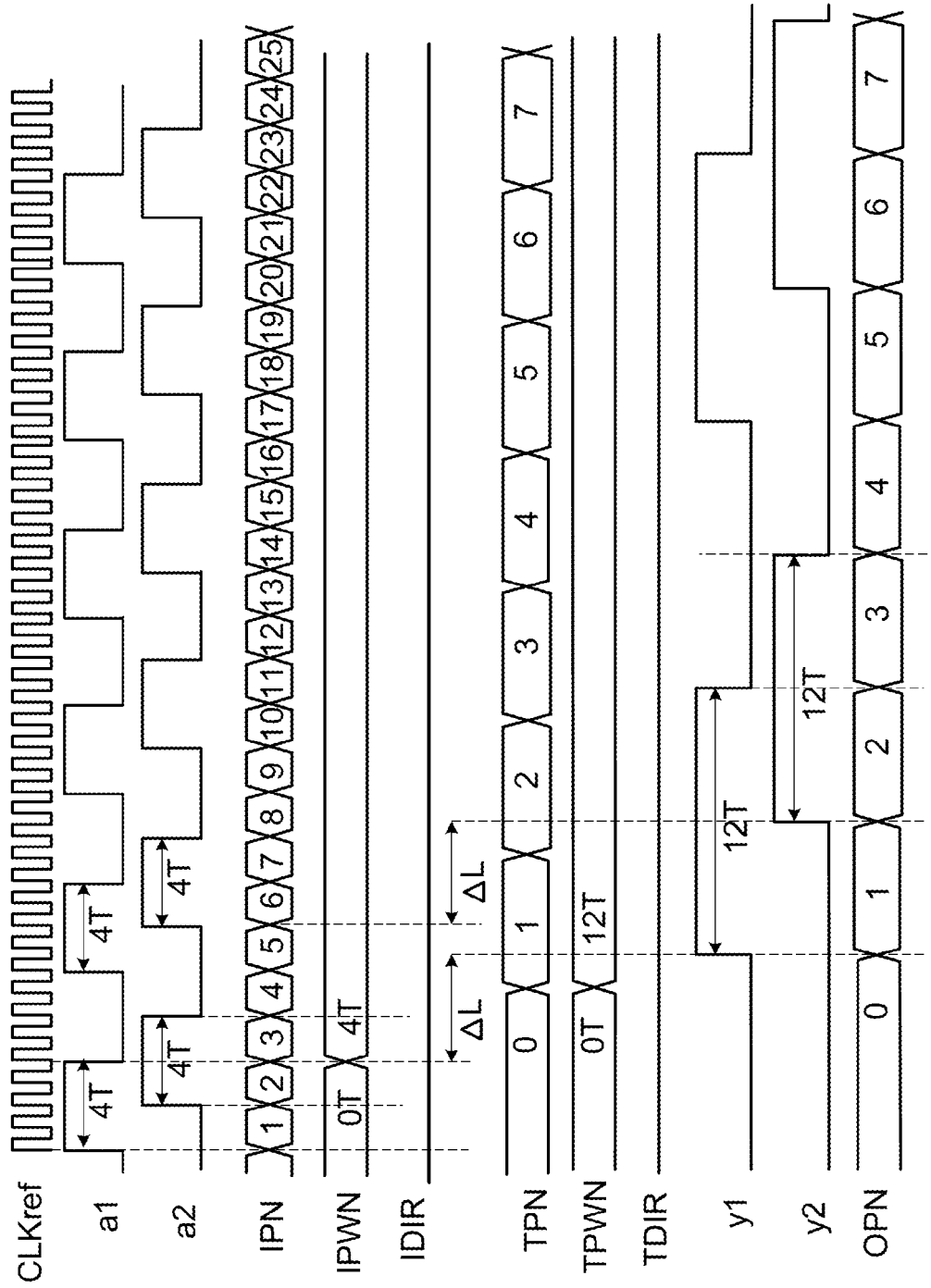
FIG. 5A is a schematic timing waveform diagram illustrating associated signals processed by the pulse processor when the frequencies of the signals a1 and a2 of the command pulse group in an A/B phase-pulse format is multiplied by 1/3 and the transferred pulse group y1 and y2 in the A/B phase-pulse format are generated.

FIG. 5A is a schematic timing waveform diagram illustrating associated signals processed by the pulse processor when the frequencies of the signals a1 and a2 of the command pulse group in an A/B phase-pulse format is multiplied by ⅓ and the transferred pulse group y1 and y2 in the A/B phase-pulse format are generated. Since the frequencies of the signals a1 and a2 of the command pulse group are multiplied by ⅓, it means that P=1 and Q=3.

In this embodiment, the input phase number IPN is changed by the phase/pulse width sampler 410 according to the edge changes of the signals a1 and a2. For example, if the command pulse group a1 and a2 denote the first rotation direction, the input phase number IPN gradually increases. Whereas, if the command pulse group a1 and a2 denote the second rotation direction, the input phase number IPN gradually decreases. That is, the input phase number IPN is a signed value such as a 2' complement value. As shown in FIG. 5A, since the command pulse group a1 and a2 denote the first rotation direction, the input phase number IPN continuously increases. In addition, the voltage level of the input direction signal IDIR is kept unchanged.

Moreover, the phase/pulse width sampler 410 may sample the signal a1 or the signal a2 according to the reference clock CLKref, and generate the input pulse width number IPWN. As shown in FIG. 5A, the phase/pulse width sampler 410 samples the signal a1 according to the reference clock CLKref, and generates the input pulse width number IPWN of 4 T.

It is supposed that the pipelining transformation of the pulse processor 400 may result in a delay time (latency) ΔL. If the input phase number IPN is 3, after the input phase number IPN is multiplied by 1 (P=1) by the first multiplier 432 and then divided by 3 (Q=3) by the first divider 438, the delay time ΔL is required for obtaining the target phase number TPN (i.e. TPN=1). From the above discussions, if the input phase number IPN=3~5, the input phase number IPN is maintained at 1. Similarly, if the input phase number IPN=6~8, the input phase number IPN is changed to 2. The rest may be deduced by analogy.

Similarly, if the input pulse width number IPWN is 4 T, after the input phase number IPN is multiplied by 3 (Q=3) by the second multiplier 452 and then divided by 1 (P=1) by the second divider 458, the delay time ΔL is required for obtaining the target pulse width number TPWN (i.e. TPWN=12 T). Obviously, since the input pulse width number IPWN is continuously maintained 4 T, the target pulse width number TPWN is maintained at 12 T.

As shown in FIG. 5A, the voltage level of the target direction signal TDIR is kept unchanged. Consequently, according to the target direction signal TDIR, the target phase number TPN and the target pulse width number TPWN, the pulse width modulator 490 generates the transferred pulse group y1 and y2 in the A/B phase-pulse format and the output phase number OPN. The pulse width of each of the transferred pulse group y1 and y2 is 12 T (i.e. twelve times the period of the reference clock CLKref). In addition, the signal y1 leads the signal y2 by 90 degrees.

Figure 5B:
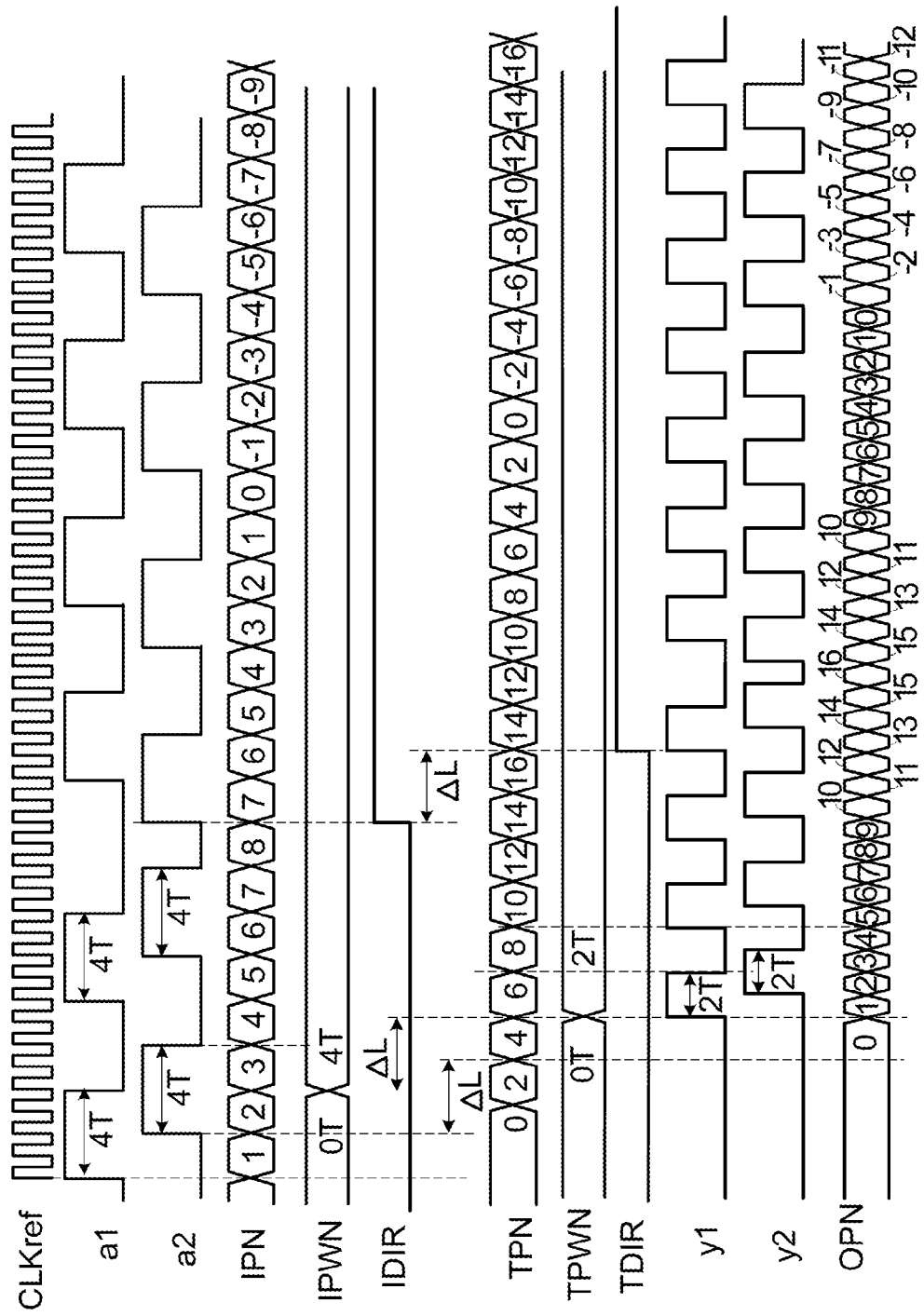
FIG. 5B is a schematic timing waveform diagram illustrating associated signals processed by the pulse processor when the frequencies of the signals a1 and a2 of the command pulse group in an A/B phase-pulse format is multiplied by 2 and the transferred pulse group y1 and y2 in the A/B phase-pulse format are generated.

FIG. 5B is a schematic timing waveform diagram illustrating associated signals processed by the pulse processor when the frequencies of the signals a1 and a2 of the command pulse group in an A/B phase-pulse format is multiplied by 2 and the transferred pulse group y1 and y2 in the A/B phase-pulse format are generated. Since the frequencies of the signals a1 and a2 of the command pulse group are multiplied by 2, it means that P=2 and Q=1.

In this embodiment, the input phase number IPN is changed by the phase/pulse width sampler 410 according to the edge changes of the signals a1 and a2. For example, if the command pulse group a1 and a2 denote the first rotation direction, the input phase number IPN gradually increases. Whereas, if the command pulse group a1 and a2 denote the second rotation direction, the input phase number IPN gradually decreases. That is, the input phase number IPN is a signed value such as a 2' complement value.

Moreover, the phase/pulse width sampler 410 may sample the signal a1 or the signal a2 according to the reference clock CLKref, and generate the input pulse width number IPWN. As shown in FIG. 5B, the phase/pulse width sampler 410 samples the signal a1 according to the reference clock CLKref, and generates the input pulse width number IPWN of 4 T.

It is supposed that the pipelining transformation of the pulse processor 400 may result in a delay time (latency) ΔL. If the input phase number IPN is 2, after the input phase number IPN is multiplied by 2 (P=2) by the first multiplier 432 and then divided by 1 (Q=1) by the first divider 438, the delay time ΔL is required for obtaining the target phase number TPN (i.e. TPN=4). From the above discussions, if the input phase number IPN=3, the input phase number IPN is changed to 6. The rest may be deduced by analogy.

Similarly, if the input pulse width number IPWN is 4 T, after the input phase number IPN is multiplied by 1 (Q=1) by the second multiplier 452 and then divided by 2 (P=2) by the second divider 458, the delay time ΔL is required for obtaining the target pulse width number TPWN (i.e. TPWN=2 T). Obviously, since the input pulse width number IPWN is continuously maintained 4 T, the target pulse width number TPWN is maintained at 2 T.

As shown in FIG. 5B, the target direction signal TDIR is switched from the low-level state to the high-level state after the input phase number IPN=8. It means that the rotation direction of the servo motor 230 is changed. Under this circumstance, after the first latch 422 and second latch 428 result in the delay time ΔL, the target direction signal TDIR is switched from the low-level state to the high-level state. Consequently, as shown in FIG. 5B, according to the target direction signal TDIR, the target phase number TPN and the target pulse width number TPWN, the pulse width modulator 490 generates the transferred pulse group y1 and y2 in the A/B phase-pulse format and the output phase number OPN. The pulse width of each of the transferred pulse group y1 and y2 is 2 T (i.e. two times the period of the reference clock CLKref). Before the input phase number IPN=16, the signal y1 leads the signal y2 by 90 degrees, indicating that the servo motor 230 is rotated in the first rotation direction. After the input phase number IPN=16, the signal y2 leads the signal y1 by 90 degrees, indicating that the servo motor 230 is rotated in the second rotation direction.

Figure 6A:
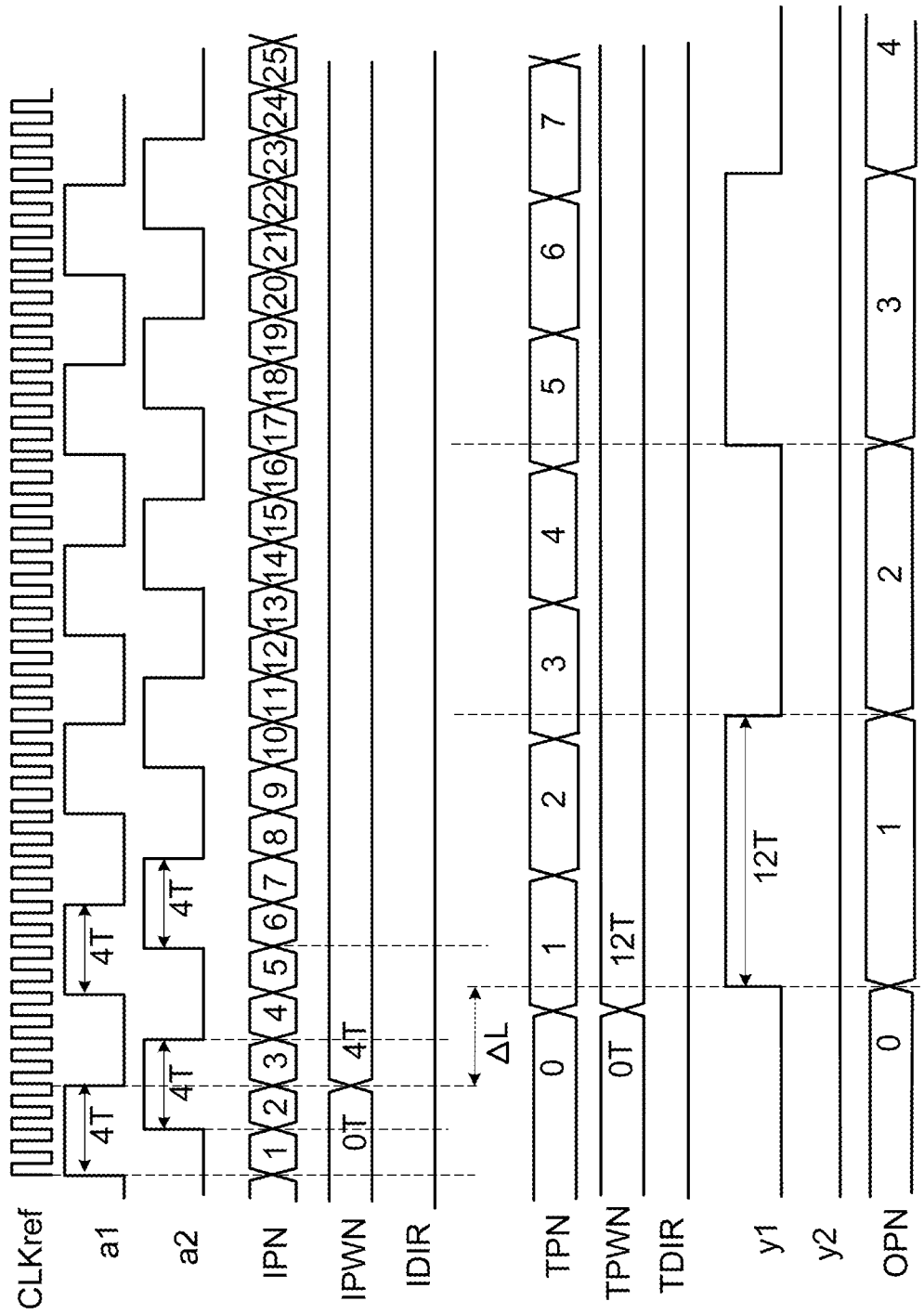
FIG. 6A is a schematic timing waveform diagram illustrating associated signals processed by the pulse processor when the frequencies of the signals a1 and a2 of the command pulse group in an A/B phase-pulse format is multiplied by 1/3 and the transferred pulse group y1 and y2 in a one pulse direction-pulse format are generated.

FIG. 6A is a schematic timing waveform diagram illustrating associated signals processed by the pulse processor when the frequencies of the signals a1 and a2 of the command pulse group in an A/B phase-pulse format is multiplied by ⅓ and the transferred pulse group y1 and y2 in a one pulse direction-pulse format are generated. Since the frequencies of the signals a1 and a2 of the command pulse group are multiplied by ⅓, it means that P=1 and Q=3.

In this embodiment, the input phase number IPN is changed by the phase/pulse width sampler 410 according to the edge changes of the signals a1 and a2. For example, if the command pulse group a1 and a2 denote the first rotation direction, the input phase number IPN gradually increases. Whereas, if the command pulse group a1 and a2 denote the second rotation direction, the input phase number IPN gradually decreases. That is, the input phase number IPN is a signed value such as a 2' complement value. As shown in FIG. 6A, since the command pulse group a1 and a2 denote the first rotation direction, the input phase number IPN continuously increases. In addition, the voltage level of the input direction signal IDIR is kept unchanged.

Moreover, the phase/pulse width sampler 410 may sample the signal a1 or the signal a2 according to the reference clock CLKref, and generate the input pulse width number IPWN. As shown in FIG. 6A, the phase/pulse width sampler 410 samples the signal a1 according to the reference clock CLKref, and generates the input pulse width number IPWN of 4 T.

It is supposed that the pipelining transformation of the pulse processor 400 may result in a delay time (latency) ΔL. If the input phase number IPN is 3, after the input phase number IPN is multiplied by 1 (P=1) by the first multiplier 432 and then divided by 3 (Q=3) by the first divider 438, the delay time ΔL is required for obtaining the target phase number TPN (i.e. TPN=1). From the above discussions, if the input phase number IPN=3~5, the input phase number IPN is maintained at 1. Similarly, if the input phase number IPN=6~8, the input phase number IPN is changed to 2. The rest may be deduced by analogy.

Similarly, if the input pulse width number IPWN is 4 T, after the input phase number IPN is multiplied by 3 (Q=3) by the second multiplier 452 and then divided by 1 (P=1) by the second divider 458, the delay time ΔL is required for obtaining the target pulse width number TPWN (i.e. TPWN=12 T). Obviously, since the input pulse width number IPWN is continuously maintained 4 T, the target pulse width number TPWN is maintained at 12 T.

As shown in FIG. 6A, the voltage level of the target direction signal TDIR is kept unchanged. Consequently, according to the target direction signal TDIR, the target phase number TPN and the target pulse width number TPWN, the pulse width modulator 490 generates the transferred pulse group y1 and y2 in the one pulse direction-pulse format and the output phase number OPN. The pulse width of the transferred pulse group y1 is 12 T (i.e. twelve times the period of the reference clock CLKref). In addition, the signal y1 is maintained at the low-level state, which denotes the first rotation direction.

FIG. 6B is a schematic timing waveform diagram illustrating associated signals processed by the pulse processor when the frequencies of the signals a1 and a2 of the command pulse group in an A/B phase-pulse format is multiplied by 2 and the transferred pulse group y1 and y2 in a one pulse direction-pulse format are generated. Since the frequencies of the signals a1 and a2 of the command pulse group are multiplied by 2, it means that P=2 and Q=1.

In this embodiment, the input phase number IPN is changed by the phase/pulse width sampler 410 according to the edge changes of the signals a1 and a2. For example, if the command pulse group a1 and a2 denote the first rotation direction, the input phase number IPN gradually increases. Whereas, if the command pulse group a1 and a2 denote the second rotation direction, the input phase number IPN gradually decreases. That is, the input phase number IPN is a signed value such as a 2' complement value.

Moreover, the phase/pulse width sampler 410 may sample the signal a1 or the signal a2 according to the reference clock CLKref, and generate the input pulse width number IPWN. As shown in FIG. 6B, the phase/pulse width sampler 410 samples the signal a1 according to the reference clock CLKref, and generates the input pulse width number IPWN of 4 T.

It is supposed that the pipelining transformation of the pulse processor 400 may result in a delay time (latency) ΔL. If the input phase number IPN is 2, after the input phase number IPN is multiplied by 2 (P=2) by the first multiplier 432 and then divided by 1 (Q=1) by the first divider 438, the delay time ΔL is required for obtaining the target phase number TPN (i.e. TPN=4). From the above discussions, if the input phase number IPN=3, the input phase number IPN is changed to 6. The rest may be deduced by analogy.

Similarly, if the input pulse width number IPWN is 4 T, after the input phase number IPN is multiplied by 1 (Q=1) by the second multiplier 452 and then divided by 2 (P=2) by the second divider 458, the delay time ΔL is required for obtaining the target pulse width number TPWN (i.e. TPWN=2 T). Obviously, since the input pulse width number IPWN is continuously maintained 4 T, the target pulse width number TPWN is maintained at 2 T.

As shown in FIG. 6B, the target direction signal TDIR is switched from the low-level state to the high-level state after the input phase number IPN=8. It means that the rotation direction of the servo motor 230 is changed. Under this circumstance, after the first latch 422 and second latch 428 result in the delay time ΔL, the target direction signal TDIR is switched from the low-level state to the high-level state. Consequently, as shown in FIG. 6B, according to the target direction signal TDIR, the target phase number TPN and the target pulse width number TPWN, the pulse width modulator 490 generates the transferred pulse group y1 and y2 in the one pulse direction-pulse format and the output phase number OPN. The pulse width of the transferred pulse group y1 is 2 T (i.e. two times the period of the reference clock CLKref). Before the input phase number IPN=16, the low-level state of the signal y2 indicates that the servo motor 230 is rotated in the first rotation direction. After the input phase number IPN=16, the high-level state of the signal y2 indicates that the servo motor 230 is rotated in the second rotation direction.

FIG. 7A is a schematic timing waveform diagram illustrating associated signals processed by the pulse processor when the frequencies of the signals a1 and a2 of the command pulse group in an A/B phase-pulse format is multiplied by ⅓ and the transferred pulse group y1 and y2 in a clockwise and counterclockwise-pulse format are generated. Since the frequencies of the signals a1 and a2 of the command pulse group are multiplied by ⅓, it means that P=1 and Q=3.

In this embodiment, the input phase number IPN is changed by the phase/pulse width sampler 410 according to the edge changes of the signals a1 and a2. For example, if the command pulse group a1 and a2 denote the first rotation direction, the input phase number IPN gradually increases. Whereas, if the command pulse group a1 and a2 denote the second rotation direction, the input phase number IPN gradually decreases. That is, the input phase number IPN is a signed value such as a 2' complement value. As shown in FIG. 7A, since the command pulse group a1 and a2 denote the first rotation direction, the input phase number IPN continuously increases. In addition, the voltage level of the input direction signal IDIR is kept unchanged.

Moreover, the phase/pulse width sampler 410 may sample the signal a1 or the signal a2 according to the reference clock CLKref, and generate the input pulse width number IPWN. As shown in FIG. 7A, the phase/pulse width sampler 410 samples the signal a1 according to the reference clock CLKref, and generates the input pulse width number IPWN of 4 T.

It is supposed that the pipelining transformation of the pulse processor 400 may result in a delay time (latency) ΔL. If the input phase number IPN is 3, after the input phase number IPN is multiplied by 1 (P=1) by the first multiplier 432 and then divided by 3 (Q=3) by the first divider 438, the delay time ΔL is required for obtaining the target phase number TPN (i.e. TPN=1). From the above discussions, if the input phase number IPN=3~5, the input phase number IPN is maintained at 1. Similarly, if the input phase number IPN=6~8, the input phase number IPN is changed to 2. The rest may be deduced by analogy.

Similarly, if the input pulse width number IPWN is 4 T, after the input phase number IPN is multiplied by 3 (Q=3) by the second multiplier 452 and then divided by 1 (P=1) by the second divider 458, the delay time ΔL is required for obtaining the target pulse width number TPWN (i.e. TPWN=12 T). Obviously, since the input pulse width number IPWN is continuously maintained 4 T, the target pulse width number TPWN is maintained at 12 T.

As shown in FIG. 7A, the voltage level of the target direction signal TDIR is kept unchanged. Consequently, according to the target direction signal TDIR, the target phase number TPN and the target pulse width number TPWN, the pulse width modulator 490 generates the transferred pulse group y1 and y2 with the clockwise and counterclockwise-pulse format and the output phase number OPN. The signal y1 denotes the first rotation direction. The pulse width of the transferred pulse group y1 is 12 T (i.e. twelve times the period of the reference clock CLKref). Moreover, since the signal y2 has no pulses, it means that the servo motor 230 is not rotated in the second direction.

Figure 7B:
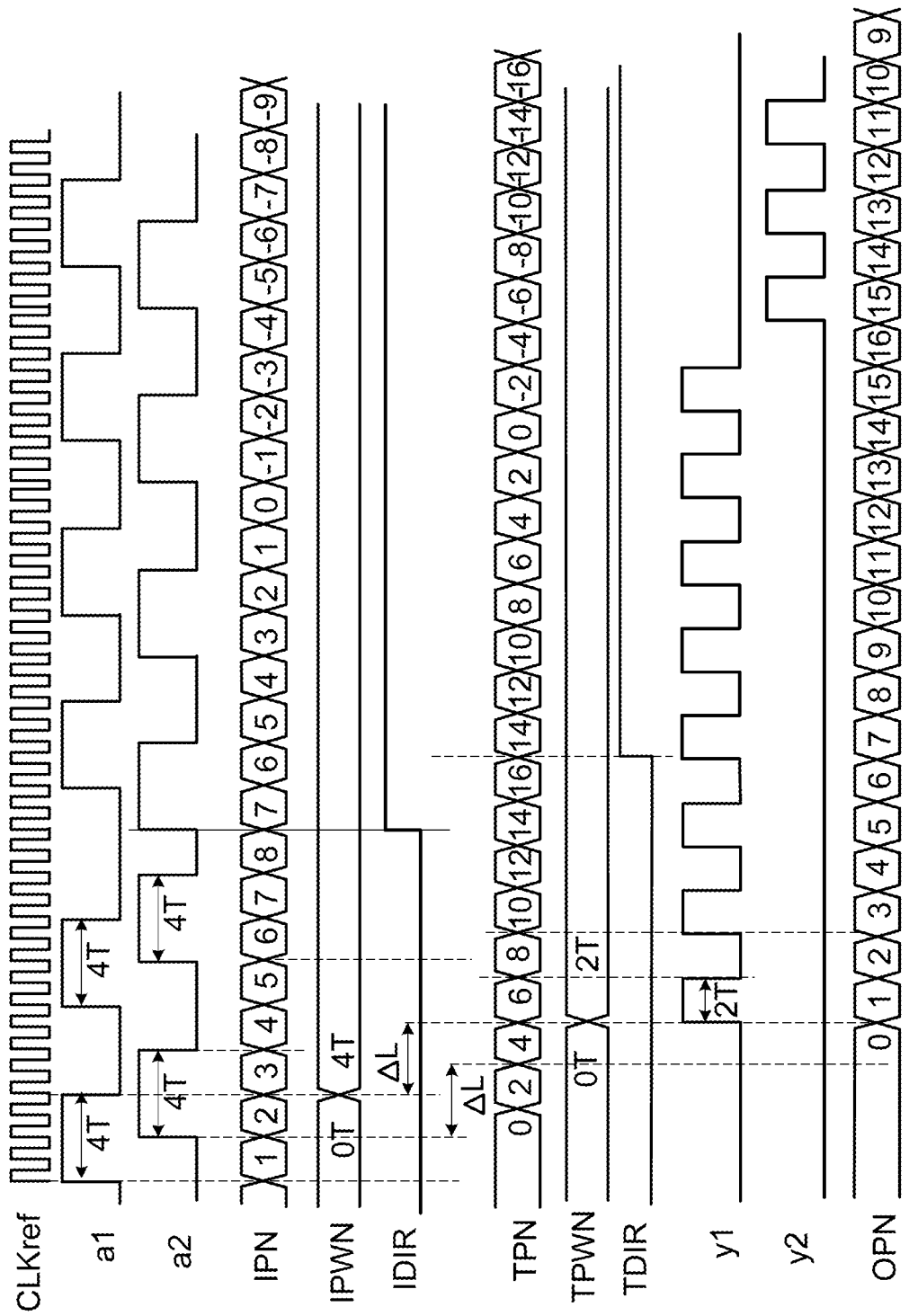
FIG. 7B is a schematic timing waveform diagram illustrating associated signals processed by the pulse processor when the frequencies of the signals a1 and a2 of the command pulse group in an A/B phase-pulse format is multiplied by 1/3 and the transferred pulse group y1 and y2 in a clockwise and counterclockwise-pulse format are generated.

FIG. 7B is a schematic timing waveform diagram illustrating associated signals processed by the pulse processor when the frequencies of the signals a1 and a2 of the command pulse group in an A/B phase-pulse format is multiplied by ⅓ and the transferred pulse group y1 and y2 in a clockwise and counterclockwise-pulse format are generated. Since the frequencies of the signals a1 and a2 of the command pulse group are multiplied by 2, it means that P=2 and Q=1.

In this embodiment, the input phase number IPN is changed by the phase/pulse width sampler 410 according to the edge changes of the signals a1 and a2. For example, if the command pulse group a1 and a2 denote the first rotation direction, the input phase number IPN gradually increases. Whereas, if the command pulse group a1 and a2 denote the second rotation direction, the input phase number IPN gradually decreases. That is, the input phase number IPN is a signed value such as a 2' complement value.

Moreover, the phase/pulse width sampler 410 may sample the signal a1 or the signal a2 according to the reference clock CLKref, and generate the input pulse width number IPWN. As shown in FIG. 7B, the phase/pulse width sampler 410 samples the signal a1 according to the reference clock CLKref, and generates the input pulse width number IPWN of 4 T.

It is supposed that the pipelining transformation of the pulse processor 400 may result in a delay time (latency) ΔL. If the input phase number IPN is 2, after the input phase number IPN is multiplied by 2 (P=2) by the first multiplier 432 and then divided by 1 (Q=1) by the first divider 438, the delay time ΔL is required for obtaining the target phase number TPN (i.e. TPN=4). From the above discussions, if the input phase number IPN=3, the input phase number IPN is changed to 6. The rest may be deduced by analogy.

Similarly, if the input pulse width number IPWN is 4 T, after the input phase number IPN is multiplied by 1 (Q=1) by the second multiplier 452 and then divided by 2 (P=2) by the second divider 458, the delay time ΔL is required for obtaining the target pulse width number TPWN (i.e. TPWN=2 T). Obviously, since the input pulse width number IPWN is continuously maintained 4 T, the target pulse width number TPWN is maintained at 2 T.

As shown in FIG. 7B, the target direction signal TDIR is switched from the low-level state to the high-level state after the input phase number IPN=8. It means that the rotation direction of the servo motor 230 is changed. Under this circumstance, after the first latch 422 and second latch 428 result in the delay time ΔL, the target direction signal TDIR is switched from the low-level state to the high-level state. Consequently, as shown in FIG. 7B, according to the target direction signal TDIR, the target phase number TPN and the target pulse width number TPWN, the pulse width modulator 490 generates the transferred pulse group y1 and y2 with the clockwise and counterclockwise-pulse format and the output phase number OPN. The signal y1 denotes the first rotation direction. The pulse width of the transferred pulse group y1 is 2 T (i.e. two times the period of the reference clock CLKref) before the input phase number IPN=16. Moreover, the signal y2 denotes the second rotation direction. The pulse width of the transferred pulse group y1 is 2 T after the input phase number IPN=16.

From the above discussions about FIGS. 5A, 5B, 6A, 6B, 7A and 7B, the pulse processor 400 can convert the command pulse group a1 and a2 in the A/B phase-pulse format into the transferred pulse group y1 and y2 in various pulse formats.

Furthermore, by the pulse processor 400, the command pulse group a1 and a2 in one of various pulse formats can be converted into the transferred pulse group y1 and y2 in one of various pulse formats.

In the above embodiments, the input phase number IPN is changed by the phase/pulse width sampler 410 according to the edge changes of the signals a1 and a2. Alternatively, the input phase number IPN is changed by the phase/pulse width sampler 410 according to the edge change of the signal a1 only. Alternatively, the input phase number IPN is changed by the phase/pulse width sampler 410 according to the edge change of the signal a2 only.

Similarly, the output phase number OPN outputted from the pulse width modulator 490 may be changed according to the edge changes of the signals y1 and y2. Alternatively, the output phase number OPN outputted from the pulse width modulator 490 may be changed according to the edge changes of the signal y1 only. Alternatively, the output phase number OPN outputted from the pulse width modulator 490 may be changed according to the edge changes of the signal y2 only.

Moreover, in the pulse processor 400, the locations of the first multiplier 432 and the first divider 438 may be exchanged, and the locations of the second multiplier 452 and the second divider 458 may be exchanged. The functions of the first multiplier 432 and the first divider 438 may be implemented by a first calculator (not shown). After the input phase number IPN is received and the input phase number IPN is multiplied by P/Q by the first calculator, the target phase number TPN is obtained. The functions of the second multiplier 452 and the second divider 458 may be implemented by a second calculator (not shown). After the input pulse width number IPWN is received and the input pulse width number IPWN is multiplied by Q/P by the second calculator, the target pulse width number TPWN is obtained. The first latch 422 and the second latch 428 may be included in a latching device (not shown). After the input direction signal IDIR is received by the latching device, the target direction signal TDIR is generated.

In the above embodiments, the pulse processor 400 is capable of converting the command pulse group a1 and a2 in one of three pulse formats into the transferred pulse group y1 and y2 in one of three pulse formats. It is noted that the three pulse formats are presented herein for purpose of illustration and description only. Of course, the pulse processor 400 is also capable of converting the command pulse group a1 and a2 in one of other pulse formats into the transferred pulse group y1 and y2.

From the above descriptions, the present invention provides a pulse processor of a servo motor system. In accordance with the present invention, the pulse processor is implemented by a hardware circuit. When compared with the micro controller, the pulse processor of the present invention can result in a short delay time ΔL. Consequently, the servo motor system can immediately respond to the change of the input signal and immediately control the servo motor. Under this circumstance, the possibility of losing control of the servo motor will be minimized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A pulse processor of a servo motor system, the pulse processor being connected with a command device and a servo motor for controlling the servo motor according to a command pulse group from the command device, the pulse processor comprising:
   a phase/pulse width sampler for generating an input direction signal, an input phase number and an input pulse width number according to a first signal and a second signal of the command pulse group;
   a first calculator comprising a first multiplier for multiplying the input phase number by P, thereby generating a first resulting value, and a first divider for receiving the first resulting value and dividing the first resulting value by Q, thereby generating a target phase number, wherein P and Q are positive integers;
   a second calculator comprising a second multiplier for multiplying the input pulse width number by Q, thereby generating a second resulting value, and a second divider for receiving the second resulting value and dividing the second resulting value by P, thereby generating a target pulse width number;
   a latching device for receiving the input direction signal and outputting a target direction signal; and
   a pulse width modulator for receiving the target direction signal, the target phase number and the target pulse width number, and outputting a transferred pulse group.

2. The pulse processor as claimed in claim 1, wherein the command pulse group is in an A/B phase-pulse format, a one pulse direction-pulse format or a clockwise and counter-clockwise-pulse format.

3. The pulse processor as claimed in claim 1, wherein the transferred pulse group is in an A/B phase-pulse format, a one pulse direction-pulse format or a clockwise and counter-clockwise-pulse format.

4. The pulse processor as claimed in claim 1, wherein the input phase number is determined according to an edge of the first signal, or the input phase number is determined according to edges of the first signal and the second signal.

5. The pulse processor as claimed in claim 4, wherein input phase number is a 2' complement value, wherein if the first signal and the second signal denote a first rotation direction, the input phase number gradually increases, and wherein if the first signal and the second signal denote a second rotation direction, the input phase number gradually decreases.

6. The pulse processor as claimed in claim 1, wherein a pulse width of the first signal is sampled by the phase/pulse width sampler according to a reference clock, so that the input pulse width number is obtained, wherein a pulse width of the transferred pulse group is determined by the pulse width modulator according to the target pulse width number and the reference clock.

7. The pulse processor as claimed in claim 1, wherein the latching device comprises a first latch for receiving the input direction signal and a second latch for outputting the target direction signal, wherein the first latch and the second latch are connected with each other in series.

8. The pulse processor as claimed in claim 1, wherein the pulse width modulator generates an output phase number according to the transferred pulse group.

9. The pulse processor as claimed in claim 8, wherein the transferred pulse group comprises a third signal and a fourth signal, wherein the output phase number is determined according to an edge of the third signal, or the output phase number is determined according to edges of the third signal and the fourth signal.

10. A pulse processor of a servo motor system, the pulse processor being connected with a command device and a servo motor for controlling the servo motor according to a command pulse group from the command device, the pulse processor comprising:
- a phase/pulse width sampler for generating an input direction signal, an input phase number and an input pulse width number according to a first signal and a second signal of the command pulse group;
- a first calculator for receiving the input phase number and multiplying the input phase number by P/Q, thereby generating a target phase number, wherein P and Q are positive integers;
- a second calculator for receiving the input pulse width number and multiplying the input pulse width number by Q/P, thereby generating a target pulse width number;
- a latching device for receiving the input direction signal and outputting a target direction signal; and
- a pulse width modulator for receiving the target direction signal, the target phase number and the target pulse width number, and outputting a transferred pulse group;
- wherein if the first signal and the second signal denote a first rotation direction, the input phase number gradually increases; and if the first signal and the second signal denote a second rotation direction, the input phase number gradually decreases.

* * * * *